L. J. BLACK

OIL WELL PUMP

Re. 18,046

Original Filed April 17, 1928

Inventor

L. J. Black

By Frederick S. Stid,

Attorney

Reissued Apr. 14, 1931

Re. 18,046

UNITED STATES PATENT OFFICE

LEE J. BLACK, OF BEAUMONT, TEXAS, ASSIGNOR TO BEAUMONT IRON WORKS COMPANY, OF BEAUMONT, TEXAS, A CORPORATION OF TEXAS

OIL-WELL PUMP

Original No. 1,723,993, dated August 13, 1929, Serial No. 270,744, filed April 17, 1928. Application for reissue filed October 21, 1930. Serial No. 490,317.

This invention relates to oil well pumps and more particularly to that type of pump wherein the oil is lifted from the well by use of compressed air or gas or a mixture thereof.

An important object of this invention is the improvement of the structure shown in my prior application, No. 244,495, filed January 4, 1928, for oil well pumps, patented Aug. 13, 1929, No. 1,723,992, to permit elimination of certain of the elements employed in the structure described in said application while preserving the operative features thereof.

A further object of the invention is to provide a device of this character having means whereby the amount of air which is admitted as well as the pressure of such air may be controlled.

A further object of the invention is to provide a novel and improved packing and guide element for use in such devices.

A still further object of the invention is to provide a nozzle element associated with a valve controlling the admission of air or gas employed to lift the fluid from the well.

These and other objects I attain by the construction shown in the accompanying drawings, wherein for the purpose of illustration is shown a preferred embodiment of my invention and wherein:—

Figure 1:
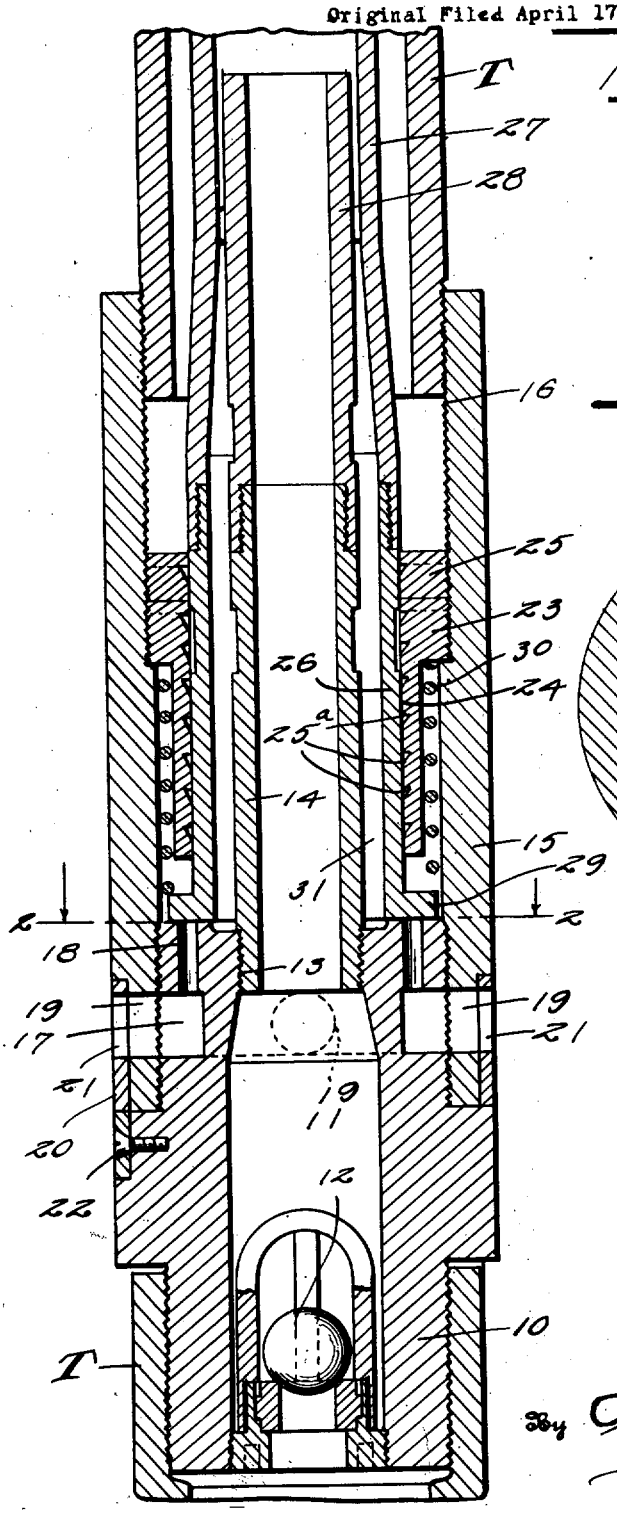
Figure 1 is a vertical sectional view through one of the nozzles of a pump constructed in accordance with my invention.
Figure 2:
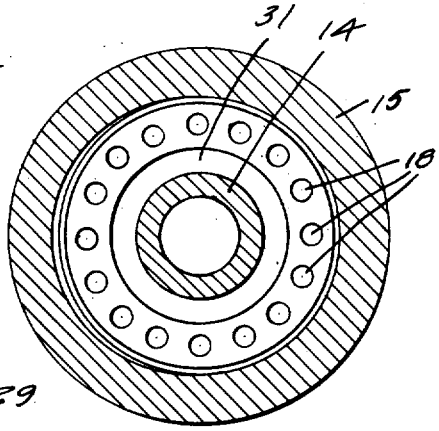
Fig. 2 is a section on the line 2—2 of Figure 1.

Referring now more particularly to the drawings, the numeral 10 generally designates a fitting having a bore 11. Within this bore at the lower end thereof is disposed a check valve organization, generally designated at 12. The upper end of the bore is interiorly threaded, as at 13, for the reception of the lower end of the tube 14 and which, as illustrated, is preferably formed in sections. The lower end of the body is exteriorly threaded for engagement with tubing T which may lead to a similar nozzle arranged at a lower level. The upper end of this body is threaded for engagement with a sleeve 15, the upper end of which is in turn interiorly threaded at 16 for engagement with upwardly extending tubing T′ which may connect to a nozzle arranged thereabove or to the discharge.

The exteriorly threaded portion of the upper end of the fitting 10 is provided with an annular groove 17 constituting a distributing chamber which communicates with vertically extending ports 18 opening through the upper end of the fitting and between the tube 14 and the inner wall of the sleeve. The lower end of the sleeve has radially extending ports 19 which communicate with the groove 17.

At its lower end, the exterior of the sleeve has rotatably mounted thereon a ring valve 20 having openings 21 which, by rotatably adjusting the ring, may be brought either into full register with the ports 19 of the sleeve or disposed to render available any desired portion of these ports.

This valve may be secured in adjusted positions by any suitable means such as that indicated at 22.

The threaded portion 16 of the sleeve at its lower end has engaged therewith the exteriorly threaded flange 23 of a guide and packing member 24, the outer face of which, below the flange, is in spaced relation to the wall of the sleeve. This guide and packing member is vertically adjustable and held in position by a lock nut 25 and the inner faces of both the packing member and nut are provided with annular sealing grooves 25ª having horizontally extending upper walls and lower walls which incline inwardly and downwardly to meet said upper walls.

Slidable within the guide and packing member 24 is a nozzle element 26, the upper end of which tapers to a point where it closely approximates the outer face of the tube 14, as indicated at 27, and then extends in parallel relation to this tube, so that a narrow annular space 28 is provided through which gas or air may pass. The lower end of this nozzle is formed with a valve 29, seating upon the upper end of the fitting 10 and closing the ports 18. A spring 30 surrounding the part 24 and engaging against the flange 23 of this part at its upper end and against the valve 29 at its lower end may be used to urge the valve to its seat until a predetermined pressure of the air or gas is built up, below the valve. The gas or air, when this pressure is attained, forces the valve 29 and nozzle 26 upwardly against the action of the spring and then passes into the space 31 between the tube 14 and the nozzle 26. In its escape through the narrow annular passage 28 near the upper end of the tube, it is directed up along the walls of the nozzle.

In its passage beyond the end of the tube 14, it acts as an ejector, creating a vacuum within the tube 14 which lifts the oil. While I have illustrated the shank or annular upwardly extending portion of the valve as being screw-threaded in connection with the nozzle 27, I do not wish to be limited to this as it is obvious that the nozzle 27 might be fixed and the valve slide with relation thereto, but it will be seen that in either case the valve forms a downward continuation of the nozzle in the sense that there is no decided break of continuity between the nozzle and the valve and thus a passage smooth and without obstruction is left for the upward movement of the fluid around the central portion of the tube at the upper end of the nozzle 27.

It also causes an intermingling of this oil with the air, so that the oil in the tube rises and is ejected therefrom to a point where it may be picked up by a second nozzle.

In using the instant construction, a plurality of nozzles are inserted in the oil well tubing at points spaced apart a distance determined by the character of the fluid which is being handled and the pressure which is available in the general manner of operation disclosed in my prior application.

It will be obvious that the sleeve 15 and tube 14 might be formed integrally with the fitting 10, the present construction having been merely adopted as providing for more convenient construction and assembly of the device. The structure, as illustrated, may be very readily and cheaply manufactured and is of such character that it will not readily get out of adjustment.

Particular attention is called to the grooves 25*a*, the upper shoulder of each of these grooves being at right angles to the direction of movement of the valve and the lower shoulder being downwardly and centrally inclined. Therefore, when air is admitted to the valve and it lifts off the seat, any fluid that may be above the valve, together with the air entering through the ports 18, rushes into these grooves and forms a seal or series of seals which minimize the passing of air between the packing element and the exterior of the portion 26, thus forcing the air to go inside of the nozzle tube 26, that is, into the space 31. When a well is once put in action, there is always a column of liquid remaining in the well tubing. Therefore, as soon as the air input is discontinued, this column of liquid, due to the form of the grooves 25*a* and the packing element and lock nut, sets back and releases the pressure in the grooves and bears down on the valve 29.

This causes the valve to seat and as soon as the air pressure becomes greater beneath the valve than the weight of the column of fluid on top of the valve, the valve again lifts, the air and liquid forming a seal in the grooves and the operation is repeated from time to time. It is, therefore, not necessary with my construction, that is, with the packing and guide element 23 and lock nut 25 formed of the grooves 25*a* that the spring 30 be used as the valve will seat without this spring. It will be noted also that the guide and packing element 23 and 24 may be adjusted up or down in the screw-threads 16 to adjustably limit the extent to which the valve may open. The groove 17 formed in the valve body 10 forms a distributing chamber by which the air which enters at the inlet ports 19 is distributed all around and passes out uniformly through the outlet ports under the valve and up through the space between the nozzle and the central tube.

Since the construction hereinbefore set forth is capable of a certain range of change and modification without materially departing from the spirit of the invention, I do not limit myself to such specific structure except as hereinafter claimed.

Thus while I have shown the ports 19 as being formed in the lower end of the sleeve 15, it is obvious that these ports might extend through the fitting 10 below the lower end of the sleeve and accomplish the same end. It is also obvious that the sleeve 15 as well as the tube 14 might be made in one piece or integral with the fitting 10 and thus the body of the nozzle consist of the portion 10 and integral concentric portions 14 and 15.

I claim:—

1. A nozzle for oil well pumps comprising a body having a bore, a tube forming an extension of the upper end of the bore, a nozzle element surrounding the tube and extending inward toward the tube to form a constricted space immediately around the mouth of the tube, ports for admitting air between the nozzle element and the tube, the lower end of the nozzle element having associated therewith a valve for sealing said ports, said valve being freely movable away from said ports under pressure of fluid through said ports.

2. A nozzle for oil well pumps comprising a body having a bore, a straight upwardly extending tube forming an extension of the upper end of the bore, a nozzle element surrounding the tube and extending inward toward the tube to form a constricted space around the mouth of the tube, ports for admitting air between the nozzle element and the tube, the lower end of the nozzle element having associated therewith a valve for sealing said ports, the valve forming an extension of the nozzle element, and means guiding the valve element and limiting the upward movement thereof, said valve being freely movable upward under pressure of fluid entering through said ports.

3. A nozzle for oil well pumps comprising a body having a bore, a straight upwardly extending tube forming an extension of the upper end of the bore, a nozzle element surrounding the tube and extending inward toward the tube to form a constricted space surrounding the mouth of the tube, ports for admitting air between the nozzle element and the tube, the lower end of the nozzle element having associated therewith a valve for sealing said ports, said valve forming an extension of the nozzle element and means regulating the admission of air to said ports, said valve being freely movable upward under pressure of fluid entering through said ports.

4. In a nozzle for oil well pumps, a fitting, a sleeve arising therefrom, the sleeve and fitting being adapted at opposite ends for connection with tubing, the fitting having a bore, a straight upwardly extending tube forming a continuation of the bore and extending upwardly through the sleeve, ports placing the exterior of the sleeve in communication with the lower end of the space between the tube and sleeve, an annular valve normally closing said ports and disposed within said space and a nozzle associated with said valve and surrounding the tube, said nozzle extending upward and inward toward the tube and then straight upward to a point above the tube, the nozzle and valve having the same internal diameter and the nozzle forming an extension of the valve.

5. In a nozzle for oil well pumps, a fitting, a sleeve arising therefrom, the sleeve and fitting being adapted at opposite ends for connection with tubing, the fitting having a bore, a tube forming a continuation of the bore and extending upwardly through the sleeve, ports placing the exterior of the sleeve in communication with the lower end of the space between the tube and sleeve, a valve normally disposed over and closing said ports and disposed within said space, a nozzle carried by said valve and surrounding the tube, the nozzle extending upward and inward toward the tube and then extending straight upward around the mouth of the tube, and means for adjustably regulating the effective area of said ports.

6. In a nozzle for oil well pumps, a fitting, a sleeve arising therefrom, the sleeve and fitting being adapted at opposite ends for connection with tubing, the fitting having a bore, a tube forming a continuation of the bore and extending upwardly through the sleeve, ports placing the exterior of the sleeve in communication with the lower end of the space between the tube and sleeve, a valve normally closing said ports and disposed within said space, a nozzle associated with said valve and surrounding the tube, and a vertically adjustable guide carried by the sleeve and engaging the nozzle and acting to limit the upward movement of the nozzle.

7. In a nozzle for oil well pumps, a fitting, a sleeve arising therefrom, the sleeve and fitting being adapted at opposite ends for connection with tubing, the fitting having a bore, a tube forming a continuation of the bore and extending upwardly through the sleeve, ports placing the exterior of the sleeve in communication with the lower end of the space between the tube and sleeve, a valve freely movable vertically and normally closing said ports and disposed within said space, a nozzle associated with said valve and surrounding the tube, and a guide carried by the sleeve and engaging the nozzle, the lower end of said guide limiting upward movement of the nozzle and valve.

8. In a nozzle for oil well pumps, a fitting, a sleeve arising therefrom, the sleeve and fitting being adapted at opposite ends for connection with tubing, the fitting having a bore, a tube forming a continuation of the bore and extending upwardly through the sleeve, ports placing the exterior of the sleeve in communication with the lower end of the space between the tube and sleeve, a valve normally closing said ports and disposed within said space and a nozzle carried by said valve and surrounding the tube, a guide having at its upper end a flange engaging the wall of the sleeve, said guide engaging the nozzle to guide the same.

9. An oil well pump including a fitting, a sleeve extending upward therefrom, the sleeve and fitting being adapted at opposite ends for connection with tubing, the sleeve having a bore, a tube forming a continuation of the bore and extending upwardly through the sleeve, the fitting being formed to provide a valve seat exteriorly of the tube and interiorly of the sleeve, the fitting being formed to provide an annular distributing chamber, there being air ports leading into said distributing chamber from the exterior of the fitting, and ports leading upward through said valve seat, an annular valve resting upon said seat and having an annular upwardly extending portion, a guide adjustably engaged with said sleeve and through which the annular upwardly extending portion of the valve passes, said guide being adjustable upon the sleeve to controllably limit upward movement of the valve and a nozzle associated with the valve and extending upward from the valve and surrounding the central tube.

10. A nozzle for oil wells including a body including a body formed to provide a valve chamber having a central bore, an upwardly extending inner tubular portion and a centrally extending outer tubular portion, there being a valve seat disposed between these two tubular portions, the body having a distributing chamber below the valve seat having ports communicating with the exterior of the body, and ports extending up through the valve seat, a check valve in the lower end of the central bore, a valve disposed between the tubular portions of the body and normally resting on the seat and having an upwardly extending tubular portion spaced from the inner tubular portion of the body, a nozzle spaced outward from the inner tubular portion and associated with the valve, a packing element adjustably mounted on the outer tubular portion and approximating the upper tubular portion of said valve, and having liquid holding sealing grooves in its inner face.

11. A nozzle for oil well pumps comprising a body having a central bore, an outer sleeve extending upward therefrom, a tube forming an extension of the upper end of the bore and concentric to the sleeve, a nozzle element surrounding the tube and disposed within the sleeve, said nozzle element forming a restricted space of constant uniform cross-sectional area around the upper end of the tube, there being ports in the body for admitting aeriform fluid between the nozzle and the tube, the lower end of the nozzle element having associated therewith a valve for sealing said ports.

In testimony whereof I hereunto affix my signature.

LEE J. BLACK.